United States Patent [19]

Bünnig

[11] 4,180,412
[45] Dec. 25, 1979

[54] METHOD FOR MANUFACTURING GLUE FOR A BINDING AGENT IN MANUFACTURE OF CHIPBOARD OR OTHER CELLULOSE PRODUCTS

[76] Inventor: C. Karl Bünnig, Am Denkmal 9, 3252 Bad Münder 1, Fed. Rep. of Germany

[21] Appl. No.: 891,684

[22] Filed: Mar. 30, 1978

[30] Foreign Application Priority Data

Apr. 6, 1977 [DE] Fed. Rep. of Germany ....... 2715501

[51] Int. Cl.$^2$ .............................................. C08L 89/00
[52] U.S. Cl. ..................................... 106/124; 106/161
[58] Field of Search ................... 260/112 B; 106/124, 106/161

[56] References Cited

U.S. PATENT DOCUMENTS 2,874,134  2/1959  Gossett ................................ 106/161

FOREIGN PATENT DOCUMENTS 183943  8/1922  United Kingdom ................. 260/112 B Primary Examiner—Theodore Morris
Attorney, Agent, or Firm—Max Fogiel

[57] ABSTRACT

A method for manufacturing a glue in which physico-chemically changed animal blood or physico-chemically changed blood components are used as binding agent in the manufacture of cellulose-containing chipboard or as binding agent for panels to be covered with wood veneer. Whole blood is added in a known manner to a substance inhibiting coagulation. Immediately before mixing the blood with the cellulose-containing particles, a single additive in the form of monobasic organic acid is added in an amount such that a pH value between 3.0 and 4.0 and a wetting of the blood components results. The added monobasic organic acid is acetic acid or propionic acid or formic acid or locatic acid, or n-butyric acid or n-valerianic acid or n-caproic acid or n-heptoic acid or mixtures of these fatty acids or their hydroxy derivatives. The whole blood or blood components and the monobasic organic acid may be separately supplied to a nozzle and mixed during spraying. The two initial mixed materials may be dried for storage and used when needed by adding water and acid.

6 Claims, No Drawings

METHOD FOR MANUFACTURING GLUE FOR A BINDING AGENT IN MANUFACTURE OF CHIPBOARD OR OTHER CELLULOSE PRODUCTS

BACKGROUND OF THE INVENTION

The present invention relates to a method for manufacturing a glue, from physico-chemically changed animal blood or physico-chemically modified blood components, and used in the manufacture of chipboard containing cellulose, or as binding agent for wood panels, containing cellulose, to be covered with wood veneer or similar item.

Glues of this type have been used in the manufacture of chipboard; but only by adding several additional substances in an alkaline environment do they provide not very strong and not very wetproof bondings and therefore cannot compete with the synthetic resins used at the present time as binding agent. As a result, glues known as blood albumins have not been used for years (German Pat. No. 429,347, German Pat. No. 638,228, Scheiber "Spanplatten" (Chipboard), Leipzig 1968, page 31 and H.-J. Deppe, K. Ernst "Technologie der Spanplatten" (Chipboard Technology), Stuttgart 1964, page 39).

It is, therefore, the object of the present invention to provide a glue containing blood or blood components. This glue, after at least 15 minutes of standing and even after 24 hours, can still be processed easily, while having properties equal to those of the binding agents comprising synthetic resins.

Another object of the present invention is to provide a method of the foregoing character which may be carried out in a simple manner.

A further object of the present invention is to provide a method as described which is economical in use.

SUMMARY OF THE INVENTION

The objects of the present invention are achieved by adding to the whole blood a substance inhibiting the coagulation of the whole blood in a known manner and by adding in a novel manner, immediately before mixing the whole blood with the cellulose-containing particles, a single additive in the form of a monobasic organic acid in such an amount that the blood-acid mixture has a pH value between 3.0 and 4.0 and a wetting of the blood components. In this manner, one obtains for the cellulose-containing natural products the same strength (stress) values as are known for the synthetic resin glues used at the present time.

Acetic acid or propionic acid or lactic acid are to be added as monobasic organic acids.

The novel features which are considered as characteristic for the invention are set forth in particular in the appended claims. The invention itself, however, both as to its construction and its method of operation, together with additional objects and advantages thereof, will be best understood from the following description of the preferred embodiment.

DESCRIPTION OF THE PREFERRED EMBODIMENT

In comparison with the animal product binding agents containing blood albumin, which must be processed with several additives in an alkaline environment, the method of the present invention with a single addition of monobasic organic acid in a slightly acidic environment results in an excellent gluing (bonding) effect. The invention is explained below on an example.

Example:

Mix 5 liters of coagulation-stabilized whole blood, whose dry mass is about 900 grams, with about 220 milliliters of acetic acid to obtain a pH value of about 4.0 with 6 kg of more or less moist cellulose-containing particles, such as very fine, fine, coarse, or very coarse wood fiber, wood chips etc., by supplying the acetic acid and the blood separately to a nozzle and spraying the cellulose-containing particles at a flow ratio of acetic acid:blood of 0.04:1.00.

The mixture of blood and acetic acid produced in this manner is fully capable of gluing at the latest after 13 minutes of standing at room temperature (about 21° C.) and can be pressed immediately thereafter or later, either without liquid removal or after drying to a moisture content of up to about 20%, with fine particles of wood into chipboard.

The same applies if the mixture comprises whole blood and acetic acid as glue for planar coating processes.

But in that case it is also possible to mix the coagulation-stabilized whole blood with the acetic acid additive in a container stirring vigorously, and to apply the mixture immediately thereafter.

The amount of carboxylic acid necessary to develop the optimum bonding capacity of animal blood depends on the solid-particle concentration of the blood, the presence of certain blood components and a pH value between 3.0 and 5.0. The minimum amount of carboxylic acid is bound up with a maximum time interval for developing the gluing (bonding) capacity; as the minimum amount of carboxylic acid is exceeded, the time for developing optimum gluing (bonding) capacity is reduced. When using acetic acid, this time can be reduced from a maximum of 13 minutes to one minute.

In the example, acetic acid was used as monobasic organic acid because it is the most economical of the monobasic organic acids cited above; the usability of branched and unsaturated fatty acids is probable, but was not further investigated because of their high cost.

The new glue from animal blood can be used wherever cellulose-containing natural products are to be bonded; this also applies, for example, to the manufacture of paper bags or sacks.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of the following claims.

What I claim is:

1. A method for manufacturing a glue from physico-chemically changed animal blood or physico-chemically changed blood components, for use as binding agent for manufacturing cellulose-containing chipboard or panels covered with wood veneer, comprising the steps of: adding to whole blood a substance inhibiting coagulation; adding for acidification a single additive in the form of a monobasic organic acid in an amount resulting in a pH value between 3.0 and 4.0 and wetting of said blood components, said second step immediately preceding mixing of said glue with cellulose-containing particles, and optimizing the mixing ratio of blood solids to said additive.

2. A method as defined in claim 1 wherein the added monobasic organic acid is selected from the group of acetic acid, propionic acid, formic acid, lactic acid, n-butyric acid, n-valerianic acid, n-caproic acid, n-heptoic acid, and mixtures of these fatty acids or their hydroxy derivatives.

3. A method as defined in claim 1 including the step of supplying the whole blood or blood components and the monobasic organic acid separately to a nozzle and mixing them during spraying.

4. A method as defined in claim 3 wherein the two initial mixed materials are dried for storage and used when needed by adding water and acid.

5. A method as defined in claim 2 wherein the two initial mixed materials are dried for storage and used when needed by adding water and acid.

6. A method as defined in claim 1 including the step of supplying the whole blood or blood components and the monobasic organic acid separately to a nozzle and mixing them during spraying; the added monobasic organic acid being selected from the group of acetic acid, propionic acid, formic acid, lactic acid, n-butyric acid, n-valerianic acid, n-caproic acid, n-heptoic acid, and mixtures of these fatty acids or their hydroxy derivatives; the two initial mixed materials being dried for storage and used when needed by adding water and acid.

* * * * *